(12) United States Patent
Gallucci et al.

(10) Patent No.: US 10,457,808 B2
(45) Date of Patent: Oct. 29, 2019

(54) POLY(ARYLENE SULFIDE) BLEND AND ARTICLES MADE THEREFROM

(71) Applicant: SABIC GLOBAL TECHNOLOGIES B.V., Bergen op Zoom (NL)

(72) Inventors: Robert Russell Gallucci, Mt. Vernon, IN (US); Hao Zhou, Newburgh, IN (US); Edward Venema, Lindebaan (DK)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/561,177

(22) PCT Filed: Mar. 25, 2016

(86) PCT No.: PCT/US2016/024170
§ 371 (c)(1),
(2) Date: Sep. 25, 2017

(87) PCT Pub. No.: WO2016/154519
PCT Pub. Date: Sep. 29, 2016

(65) Prior Publication Data
US 2018/0079903 A1    Mar. 22, 2018

(30) Foreign Application Priority Data
Mar. 25, 2015   (EP) .................................... 15382145

(51) Int. Cl.
| C08L 81/02 | (2006.01) |
| C08K 7/14 | (2006.01) |
| C08L 79/08 | (2006.01) |
| C08L 83/10 | (2006.01) |

(52) U.S. Cl.
CPC ............. *C08L 81/02* (2013.01); *C08K 7/14* (2013.01); *C08L 79/08* (2013.01); *C08L 83/10* (2013.01); *C08L 2666/20* (2013.01)

(58) Field of Classification Search
None
See application file for complete search history.

(56) References Cited

U.S. PATENT DOCUMENTS

| 3,354,129 A * | 11/1967 | Edmonds, Jr. ........ C07C 321/00 528/265 |
| 3,919,177 A * | 11/1975 | Campbell .......... C08G 75/0236 528/373 |
| 5,015,483 A | 5/1991 | Haynes et al. |
| 5,106,915 A | 4/1992 | Rock et al. |
| 5,385,970 A * | 1/1995 | Gallucci ................. C08L 69/00 524/538 |
| 5,430,102 A | 7/1995 | Glaser et al. |
| 5,502,102 A | 3/1996 | Nazareth |
| 5,986,016 A | 11/1999 | Puyenbroek et al. |
| 6,072,010 A | 6/2000 | Puyenbroek |
| 6,469,606 B1 * | 10/2002 | Tada ..................... H01F 27/085 336/83 |
| 6,610,773 B1 | 8/2003 | Sundararaj et al. |
| 7,652,107 B2 | 1/2010 | Gallucci et al. |
| 8,071,693 B2 | 12/2011 | Banerjee et al. |
| 8,168,726 B2 | 5/2012 | Banerjee et al. |
| 8,309,637 B2 | 11/2012 | Sanner et al. |
| 8,349,933 B2 | 1/2013 | Bhandari et al. |
| 8,450,412 B2 | 5/2013 | Elkovitch et al. |
| 8,491,977 B2 | 7/2013 | Shin et al. |
| 8,597,788 B2 | 12/2013 | Banerjee et al. |
| 8,618,218 B2 | 12/2013 | Ramalingam et al. |
| 2007/0299215 A1 * | 12/2007 | Banerjee ............. C08G 73/106 525/477 |
| 2008/0139711 A1 * | 6/2008 | Borade ................ C08K 5/0066 524/100 |
| 2013/0079474 A1 | 3/2013 | Ramalingam et al. |
| 2013/0194556 A1 | 8/2013 | Chi et al. |
| 2013/0194579 A1 | 8/2013 | Mohara et al. |
| 2013/0194580 A1 | 8/2013 | Yuan et al. |
| 2014/0039099 A1 | 2/2014 | Gallucci et al. |

FOREIGN PATENT DOCUMENTS

| EP | 0307670 A1 | 3/1989 |
| EP | 0732366 A2 | 9/1996 |

OTHER PUBLICATIONS

International Search Report for International Application No. PCT/US16/24170, International Filing Date Mar. 26, 2016, dated Jun. 24, 2016, 5 pages.

Written Opinion for International Application No. PCT/US16/24170, International Filing Date Mar. 26, 2016, dated Jun. 24, 2016, 6 pages.

* cited by examiner

*Primary Examiner* — Robert S Loewe
(74) *Attorney, Agent, or Firm* — Cantor Colburn LLP

(57) ABSTRACT

Disclosed herein is a composition comprising a poly(arylene sulfide); a polysiloxane/polyimide block copolymer; glass fiber and an optional platy filler. The polysiloxane/polyimide block copolymer has greater than or equal to 10 weight percent siloxane content, based on the total weight of the polysiloxane/polyimide block copolymer. The composition retains greater than or equal to 60% of the initial viscosity after being retained at 320° C. for 30 minutes and the composition has an OSU peak heat release less than 45 kW/m2 when measured using the method of FAR F25.4 and according to FAR 25.853 (d). Articles comprising the composition are also described.

9 Claims, No Drawings

POLY(ARYLENE SULFIDE) BLEND AND ARTICLES MADE THEREFROM

CROSS REFERENCE TO RELATED APPLICATIONS

This application is a National Stage application of PCT/US16/24170, filed Mar. 25, 2016, which claims the benefit of European Application Number 15382145.9, filed Mar. 25, 2015, both of which are incorporated by reference in their entirety herein.

BACKGROUND

Flame retardant (FR) polymers and polymer blends, for example blends with UL V0 and 5V A and B Underwriters Laboratories flammability ratings, are widely prepared and used, especially in a wide variety of electrical and electronic applications. Conversely, only a very limited set of polymers and polymer blends are used in aircraft and other transportation applications, particularly interior parts. All of these applications have stringent flammability safety requirements that the polymer or polymer blend must meet. Particular requirements include smoke density, flame spread, and heat release values. In the United States, Federal Aviation Regulation (FAR) Part 25.853 sets forth the airworthiness standards for aircraft compartment interiors. The safety standards for aircraft and transportation systems used in the United States include a smoke density test specified in FAR 25.5 Appendix F, Part V Amdt 25-116. Flammability requirements include the heat release rate standard described in FAR F25.4 (FAR Section 25, Appendix F, Part IV). Smoke density requirements can be evaluated according to ASTM E-662, ASTM F-814, Airbus ABD0031 and Boeing BSS 7239. In the event of a fire, components made from materials having a low heat release rate, low peak heat release and low smoke density can increase the amount of time available for escape and provide for better visibility during a fire.

In view of the current interior material safety standards, and in anticipation of more stringent standards in the future, materials that exceed governmental and aircraft manufacturer flame safety requirements are sought. Such materials should also advantageously maintain excellent physical and rheological properties, such melt volume rate, melt stability and tensile modulus.

BRIEF DESCRIPTION

Described herein is a composition comprising a poly(arylene sulfide); 0.5 to 5 weight percent of a polysiloxane/polyimide block copolymer; and 5 to 50 weight percent of glass fiber wherein weight percent is based on the combined weight of poly(arylene sulfide), polysiloxane/polyimide block copolymer and glass fiber, the polysiloxane/polyimide block copolymer has greater than or equal to 10 weight percent siloxane content, based on the total weight of the polysiloxane/polyimide block copolymer, the composition retains greater than or equal to 60% of the initial melt viscosity after being retained at 320° C. for 30 minutes and the composition has an OSU peak heat release less than 45 kW/m$^2$ when measured using the method of FAR F25.4 and according to FAR 25.853 (d).

Also described herein is a composition comprising a poly(arylene sulfide); 0.5 to 10 weight percent of a polysiloxane/polyimide block copolymer; 5 to 50 weight percent of glass fiber, and a platy filler, wherein weight percent is based on the combined weight of poly(arylene sulfide), polysiloxane/polyimide block copolymer, glass fiber, and platy filler, the polysiloxane/polyimide block copolymer has greater than or equal to 10 weight percent siloxane content, based on the total weight of the polysiloxane/polyimide block copolymer, the composition retains greater than or equal to 60% of the initial melt viscosity after being retained at 320° C. for 30 minutes and the composition has an OSU peak heat release less than or equal to 25 kW/m$^2$ when measured using the method of FAR F25.4 and according to FAR 25.853 (d).

Also described herein is a shaped article comprising the composition described in either of the preceding paragraphs.

The above described and other features are exemplified by the following figures and detailed description.

DETAILED DESCRIPTION

The composition comprising a poly(arylene sulfide); a polysiloxane/polyimide block copolymer; glass fiber and an optional platy filler has a surprisingly low peak heat release and a surprisingly low heat release after 2 minutes when compared to a composition comprising a poly(arylene sulfide) and glass fiber. The peak heat release shows over a 40% reduction through the addition of a very small amount of polysiloxane/polyimide block copolymer. The time to reach peak heat release was increased significantly as well. These improvements in heat release are achieved while still retaining other key properties of the poly(arylene sulfide) such as melt volume rate, melt stability and tensile modulus. Additionally, the low smoke density of poly(arylene sulfide) is maintained. The low heat release and longer time to reach peak heat release provide materials that allow construction of passenger aircraft and trains that allow better conditions for escape and survival in the event of a fire.

The composition retains greater than or equal to 60% of the initial melt viscosity after being retained at 320° C. for 30 minutes. The composition can retain greater than or equal to 70% of the initial melt viscosity after being retained at 320° C. for 30 minutes.

The composition, without platy filler, has a peak heat release less than 45 kilowatts per square meter (kW/m$^2$) measured using the method of FAR F25.4, in accordance with Federal Aviation Regulation FAR 25.853 (d). The composition can have an OSU peak heat release less than or equal to 40 kW/m$^2$.

The composition, further comprising platy filler, has a peak heat release less than or equal to 25 kilowatts per square meter (kW/m$^2$) measured using the method of FAR F25.4, in accordance with Federal Aviation Regulation FAR 25.853 (d). The composition can have an OSU peak heat release less than or equal to 20 kW/m$^2$.

The composition, without platy filler, has an OSU integrated 2 minute heat release less than 25 kilowatt-minute/square meter (kW-min/m$^2$) measured using the method of FAR F25.4, in accordance with Federal Aviation Regulation FAR 25.853 (d). The composition can have an OSU integrated 2 minute heat release less than or equal to 20 kW-min/m$^2$.

The composition, further comprising platy filler, has an OSU integrated 2 minute heat release less than 45 kilowatt-minute/square meter (kW-min/m$^2$) measured using the method of FAR F25.4, in accordance with Federal Aviation Regulation FAR 25.853 (d). The composition can have an OSU integrated 2 minute heat release less than or equal to 43 kW-min/m$^2$.

The composition, without a platy filler, has a time to peak heat release of greater than or equal to 150 seconds measured using the method of FAR F25.4, in accordance with Federal Aviation Regulation FAR 25.853 (d). The composition can have a time to peak heat release of greater than or equal to 160 seconds.

The composition further comprising a platy filler has a time to peak heat release of greater than or equal to 130 seconds measured using the method of FAR F25.4, in accordance with Federal Aviation Regulation FAR 25.853 (d). The composition can have a time to peak heat release of greater than or equal to 135 seconds.

The composition has a melt viscosity of 3,000 to 10,000 Poise after 30 minutes at 320° C. Within this range the melt viscosity can be greater than or equal to 3,500 or, greater than or equal to 4,000 Poise. Also within this range the melt viscosity can be less than or equal to 9,000 or, less than or equal to 8,000 Poise determined according to ASTM D4440-08 after 30 minutes at temperature.

The poly(arylene sulfide) has repeating units of the formula:

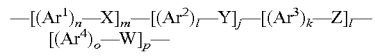

wherein $Ar^1$, $Ar^2$, $Ar^3$, and $Ar^4$ are independently arylene units of 6 to 18 carbons, W, X, Y, and Z are independently bivalent linking groups selected from —SO$_2$—, —S—, —SO—, —CO—, —O—, —C(O)O—, alkylene group having 1 to 6 carbons, or alkylidene group having 1 to 6 carbons, wherein at least one of the linking groups is —S—; and n, m, i, j, k, l, o, and p are independently 0, 1, 2, 3, or 4 with the proviso that their sum total is not less than 2.

The arylene units $Ar^1$, $Ar^2$, $Ar^3$, and $Ar^4$ may be selectively substituted or unsubstituted. Exemplary arylene units are phenylene, biphenylene, naphthylene, anthracene and phenanthrene. The poly(arylene sulfide) typically includes more than 30 mol %, more than 50 mol %, or more than 70 mol % arylene sulfide (—S—) units. For example, the poly(arylene sulfide) may include at least 85 mol % sulfide linkages attached directly to two aromatic rings. In one particular embodiment, the poly(arylene sulfide) is a poly (phenylene sulfide), defined herein as containing the phenylene sulfide structure —(C$_6$H$_4$—S)$_n$— (wherein n is an integer of 1 or more) as a component thereof. Examples of PPS resin are described in ASTM D6358-11.

Synthesis techniques that may be used in making a poly(arylene sulfide) are generally known in the art. By way of example, a process for producing a poly(arylene sulfide) can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalodiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihaloaromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the poly(arylene sulfide) or to regulate the polymerization reaction and/or the molecular weight of the poly(arylene sulfide).

The poly(arylene sulfide) may be a homopolymer or a copolymer. For instance, selective combination of dihaloaromatic compounds can result in a poly(arylene sulfide) copolymer containing not less than two different units. For instance, when p-dichlorobenzene is used in combination with m-dichlorobenzene or 4,4'-dichlorodiphenylsulfone, a poly(arylene sulfide) copolymer can be formed containing segments having the structure of formula:

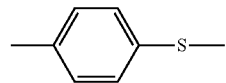

and segments having the structure of formula:

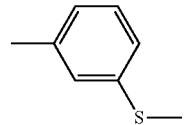

or segments having the structure of formula:

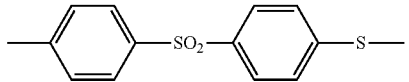

The poly(arylene sulfide) may be linear, branched or a combination of linear and branched. Linear poly(arylene sulfide)s typically contain 80 mol % or more of the repeating unit —(Ar—S)—. Such linear polymers may also include a small amount of a branching unit or a cross-linking unit, but the amount of branching or cross-linking units is typically less than 1 mol % of the total monomer units of the poly(arylene sulfide). A linear poly(arylene sulfide) polymer may be a random copolymer or a block copolymer containing the above-mentioned repeating unit. Semi-linear poly (arylene sulfide)s may likewise have a cross-linking structure or a branched structure introduced into the polymer a small amount of one or more monomers having three or more reactive functional groups. By way of example, monomer components used in forming a semi-linear poly(arylene sulfide) can include an amount of polyhaloaromatic compounds having two or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to 4 methyl substituents, the total number of carbon atoms in R' being within the range of 6 to 16. Examples of some polyhaloaromatic compounds having more than two halogens substituted per molecule that can be employed in forming a semi-linear poly(arylene sulfide) include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and combinations comprising at least one of the foregoing.

Regardless of the particular structure, the weight average molecular weight of the poly(arylene sulfide) can be greater than or equal to 15,000 grams per mole (g/mol), or, greater than or equal to 30,000 g/mol. Molecular weight can be determined by gel permeation chromatography (GPC) as per ASTM D5296-11 using polystyrene standards. In some instances a high temperature GPC methods, for example as per ASTM D6474-11, may be employed using 1-chloronaphthalene at 220° C. as solvent.

In certain cases, a small amount of chlorine may be employed during formation of the poly(arylene sulfide). Nevertheless, the poly(arylene sulfide) may still have a low chlorine content, such as less than or equal to 1000 ppm, or less than or equal to 900 ppm, or less than or equal to 800 ppm, or, less than or equal to 700 ppm. Within this range the chlorine content can be greater than or equal to 1 ppm. The poly(arylene sulfide) can be free of chlorine or other halogens. In other instances the poly(arylene sulfide) will have a chlorine content of at least 100 ppm.

The poly(arylene sulfide) may be a poly(phenylene sulfide) having a crystalline melting point of 250° C. to 290° C. as determined by differential scanning calorimetry (DSC) using a 20° C./minute heating rate and the crystalline melting point (Tm) determined on the second heat as described by ASTM D3418-12.

The poly(arylene sulfide) is present in an amount of 45 wt % to 94.5 wt %, based on the combined weight of the poly(arylene sulfide), polysiloxane/polyimide block copolymer and glass fiber. Within this range the amount of poly(arylene sulfide) can be greater than or equal to 50, or, greater than or equal to 55 wt %. Also within this range the amount of poly(arylene sulfide) can be less than or equal to 80, or, less than or equal to 70 wt %.

Polysiloxane/polyimide block copolymer comprises repeating groups of formula (I) and formula (II):

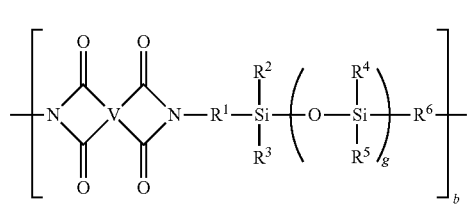

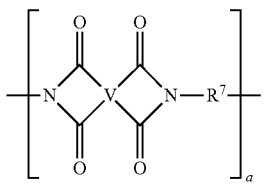

wherein "b" is an integer greater than 1, or, more specifically, 10 to 10,000; g is an integer of 1 to 40; a is more than 1, typically 10 to 1,000, and more specifically can be 10 to 500; R" are independently at each occurrence selected from the group consisting of substituted or unsubstituted, saturated, unsaturated or aromatic monocyclic and polycyclic groups having 5 to 30 carbon atoms, substituted or unsubstituted alkyl groups having 1 to 30 carbon atoms, and substituted or unsubstituted alkenyl groups having 2 to 30 carbon atoms, and V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers.

Suitable substitutions include, but are not limited to, ethers, epoxides, amides, esters, and combinations comprising at least one of the foregoing. Exemplary linkers include, but are not limited to, tetravalent aromatic radicals of formula (III), such as:

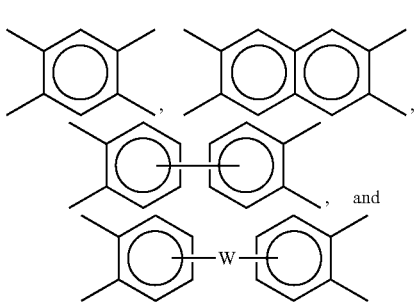

wherein W is a divalent moiety such as —O—, —S—, —C(O)—, —SO$_2$—, —SO—, —C$_y$H$_{2y}$— (y being an integer of 1 to 5), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited to, divalent radicals of formula (IV):

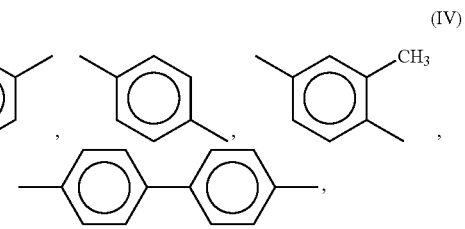

In some embodiments the polysiloxane/polyimide block copolymer is a polysiloxane/polyetherimide block copolymer comprising repeating groups of formula (VI) and (VII):

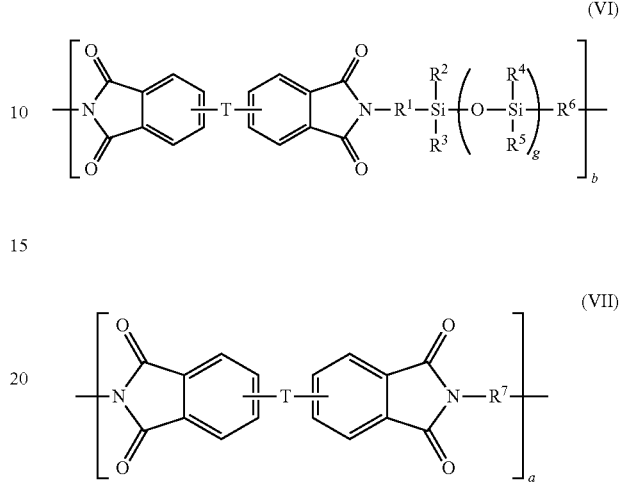

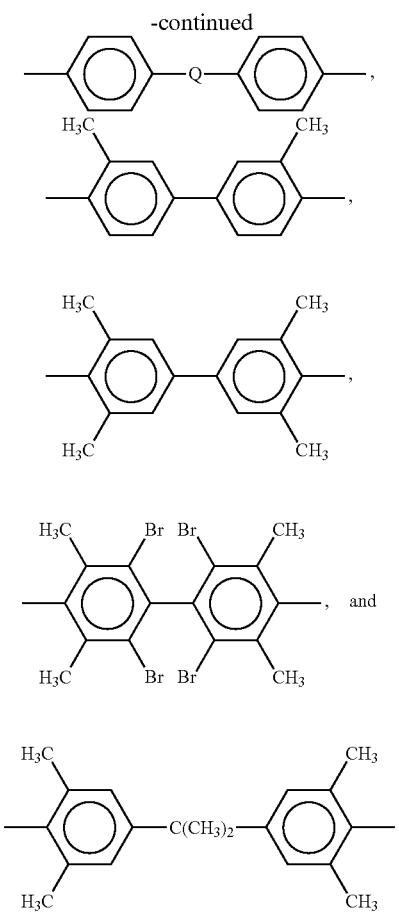

wherein Q includes, but is not limited to, a divalent moiety comprising —O—, —S—, —C(O)—, —SO$_2$—, —SO—, —C$_y$H$_{2y}$— (y being an integer from 1 to 5), and halogenated derivatives thereof, including perfluoroalkylene groups.

R$^7$ in formula (II) includes but is not limited to substituted or unsubstituted divalent organic radicals such as: aromatic hydrocarbon radicals having 6 to 20 carbon atoms and halogenated derivatives thereof; straight or branched chain alkylene radicals having 2 to 20 carbon atoms; cycloalkylene radicals having 3 to 20 carbon atoms; or divalent radicals of the general formula (V)

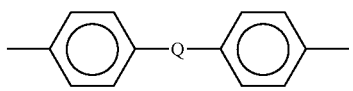

wherein Q is defined as above.

wherein T is —O—, —S—, —SO$_2$— or a group of the Formula —O—Z—O— wherein the divalent bonds of the —O— or the —O—Z—O— group are in the 3,3', 3,4', 4,3', or the 4,4' positions, and wherein Z, R$^{1-7}$, g, a, and b are defined as described above.

The polysiloxane/polyimide block copolymer can be prepared by various methods, including the reaction of a dianhydride with a diamino siloxane and a non-siloxane diamine as described in U.S. Pat. No. 7,847,023.

Polysiloxane/polyimide block copolymers comprise polysiloxane blocks and polyimide blocks. In random polysiloxane/polyimide block copolymers the size of the siloxane block is determined by the number of siloxy units (analogous to g in formula (I)) in the monomer used to form the block copolymer. In some non-random polysiloxane/polyimide block copolymers the order of the polyimide blocks and polysiloxane blocks is determined but the size of the siloxane block is still determined by the number of siloxy units in the monomer. In contrast, the polysiloxane/polyimide block copolymers described herein have extended siloxane blocks. Two or more siloxane monomers are linked together to form an extended siloxane oligomer which is then used to form the block copolymer.

In some embodiments the polysiloxane/polyimide block copolymer comprises extended block repeating units of formula (XI)

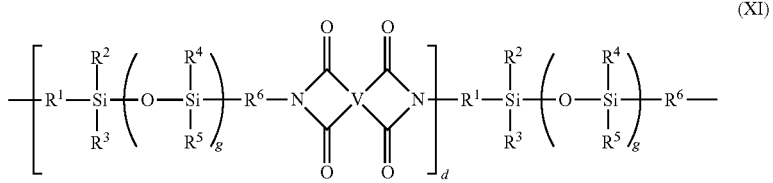

wherein $R^{1-6}$, V, and g are defined as above and d is greater than or equal to 1. In some embodiments d is less than or equal to 50, or, less than or equal to 25, or, less than or equal to 10.

The polysiloxane/polyimide block copolymer has a siloxane content of 10 to 50 weight percent, or, 10 to 30 weight percent, based on the total weight of the block copolymer. In some embodiments the polysiloxane block of the copolymer has a number average molecular weight (Mn) of 300 to 3000, as determined by gel permeation chromatography for example as per ASTM D5296-11.

Polysiloxane/polyimide block copolymers having extended siloxane blocks are made by forming an extended siloxane oligomer and then using the extended siloxane oligomer to make the block copolymer as described in U.S. Pat. Nos. 7,847,023 and 4,808,686.

The polysiloxane/polyimide block copolymer is present in compositions without platy filler in an amount of 0.5 to 5 weight percent, based on the combined weight of the poly(arylene sulfide), polysiloxane/polyimide block copolymer and glass fiber. Within this range the polysiloxane/polyimide block copolymer may be present in an amount greater than or equal to 1 weight percent. Also within this range the polysiloxane/polyimide block copolymer may be present in an amount less than or equal to 3 weight percent.

In compositions comprising a platy filler, the polysiloxane/polyimide block copolymer is present in an amount of 0.5 to 10 weight percent, based on the combined weight of the poly(arylene sulfide), polysiloxane/polyimide block copolymer and glass fiber. Within this range the polysiloxane/polyimide block copolymer may be present in an amount greater than or equal to 1 weight percent.

Useful glass fibers can be formed from any type of fiberizable glass composition known to those skilled in the art, and include those prepared from fiberizable glass compositions commonly known as "E-glass," "A-glass," "C-glass," "D-glass," "R-glass," "S-glass," as well as E-glass derivatives that are fluorine-free and/or boron-free. Most reinforcement mats comprise glass fibers formed from E-glass and are included in the compositions described herein.

Commercially produced glass fibers generally have filament diameters of 4 to 35 micrometers, and most commonly produced E-glass fibers have a filament diameter of 9 to 30 micrometers. The filaments can be made by standard processes, e.g., by steam or air blowing, flame blowing and mechanical pulling. Use of non round fiber cross section is also possible. The glass fiber can comprise a chopped glass with a bundle length of 10 to 40 millimeters (mm) with an individual fiber diameter of 6 to 17 micrometers, or 9 to 12 micrometers.

The glass fibers may be sized (coated) or unsized (uncoated). Sized glass fibers are conventionally coated on at least a portion of their surfaces with a sizing composition selected for compatibility with the polymeric thermoplastic matrix material. The sizing composition facilitates wet-out and wet-through of the matrix material upon the fiber strands and assists attaining desired physical properties in the composition.

The glass fiber is present in an amount of 5 to 50 weight percent, based on the combined weight of the poly(arylene sulfide), polysiloxane/polyimide block copolymer and glass fiber. Within this range the glass fiber can be present in an amount greater than or equal to 7, or, greater than or equal to 20 weight percent. Also within this range the glass fiber can be present in an amount less than or equal to 50, or, less than or equal to 40 weight percent.

The composition can optionally comprise a platy filler. Exemplary platy fillers include mica, flaked glass or a combination thereof. Platy fillers are recognized as having a length and width significantly greater than the thickness. For example, the length and/or width can be greater than or equal to 20 times larger than the thickness, or, greater than or equal to 50 times the thickness, or, greater than or equal to 100 times the thickness. Typically the width is greater than or equal to 25% of the length, or, greater than or equal to 50% of the length. The thickness of the platy filler can be 0.5 to 300 micrometers, or, 1 to 100 micrometers. The longest dimension (of length and width) can be 5 to 1000 micrometers, or, 20 to 300 micrometers.

The platy filler may be coated with a surfactant, sizing or other type of coating to facilitate and/or stabilize dispersion of the fiber or filler in the poly(arylene sulfide), polysiloxane/polyimide block copolymer, or both. Exemplary coatings include functionalized silanes such as amino, mercapto, or epoxy functionalized alkoxy silanes.

The combination of glass fiber and platy filler yields a composition which is dimensionally stable when molded and demonstrates little or no warp when molded. Poly(arylene sulfide) compositions can suffer from poor dimensional stability but the combination of glass fiber and platy filler reduces this issue in the compositions described herein. The composition comprising glass fiber and platy filler demonstrates significantly less warp than poly(arylene sulfide)/glass fiber compositions.

The glass fiber and platy filler can be present in a combined amount of 10 to 50 weight percent, based on the combined weight of the poly(arylene sulfide), polysiloxane/polyimide block copolymer, glass fiber and platy filler. Within this range the combined amount of fiber and filler can be greater than or equal to 20, or, greater than or equal to 30 weight percent. Also within this range the combined amount of fiber and filler can be less than or equal to 45, or, less than or equal to 40 weight percent.

The weight ratio of glass fiber to platy filler can be 80:20 to 20:80. Within this range the weight ratio can be 70:30 to 50:50.

The composition can optionally comprise 0.1 to 5 weight percent talc, based on the combined weight of poly(arylene sulfide), polysiloxane/polyimide block copolymer and glass fiber. The talc can have an average particle size of 0.1 to 20 micrometers.

The composition may optionally comprise a mold release agent, a UV absorber, a heat stabilizer, a light stabilizer, a lubricant, a plasticizer, a pigment, a dye, a colorant, an anti-static agent, or a combination thereof. Exemplary colorants include carbon black and titanium dioxide. In some instances the titanium dioxide will be encapsulated with a shell comprising silica and/or alumina and have a particle size of from 1 to 10 microns. The composition may further comprise dispersants or coupling agents to improve the dispersion and wettability of particulate additives such as colorants. These additives are usually present in an amount of 0.01 to 5 weight percent, based on the total weight of the composition.

Also described herein is a shaped article comprising the composition described above. The shaped article has a thickness of 0.2 millimeters to 4 centimeters and a length that is at least 10 times larger than the thickness. "Shaped" describes an article which comprises a curve, angle, change in thickness or combination comprising at least one of the foregoing. The shaped article can form all or part of items such as lighting fixtures, luggage bins, arm rests, seat backs, trays, sanitation fixtures, electrical devices, wall cabin panels, fibers and fabrics, laminates, tapes, foams, carts, cookware, handles and the like.

The composition is further demonstrated by the following non-limiting examples.

EXAMPLES

The following examples were prepared on a 2.5 inch (64 millimeter) single screw vacuum vented extruder. Temperature settings were 600 to 650° F. (315 to 345° C.) and the extruder was run at 90 rpm. The examples used the materials shown in Table 1.

TABLE 1

| | |
|---|---|
| PPS | A poly(phenylene sulfide) commercially available from Ticona under the trademark Fortran, 0214B1 grade |
| GF | Chopped glass fiber having a diameter of 10 micrometers and commercially available from Owens Corning |
| PS/PI | A polysiloxane/polyimide block copolymer having 34 weight percent of a D10 dimethyl siloxane |
| Mica | Mica with an 89 micrometer mean particle size and an aspect ratio of 65 commercially available as Suzorite 150NY |
| Talc | Jetfine 3CA talc from Luzenac, 1 micrometer median particle size |

Examples 1 and 2 and Comparative Example A

The examples were made as described above using the compositions shown in Table 2. Amounts of the components are shown in weight percent based on the combined weight of the poly(phenylene sulfide), glass fiber, and polysiloxane/polyimide copolymer. The compositions were tested as follows.

Melt volume rate was determined according to ASTM D1238-10 at 300° C. and 5 kilograms at 6 minutes and 18 minutes. Results are shown in cubic centimeters per 10 minutes (cm$^3$/10 min). Tensile modulus and tensile strength were determined according to ASTM D638-10, crosshead speed was 5 mm/minute. Tensile modulus (T mod) and tensile strength at yield (T Str) are reported in megaPascals (MPa). The examples of Table 2 were melted in a parallel plate rheometer and held at 320° C. as a function of time at a constant shear rate of about 10 radian/second. Viscosity was measured in Pascal-seconds (Pa-s) using a method based on ASTM D4440-08. The blends were allowed to melt and equilibrate for 5 minutes and then viscosity was recorded. During time at temperature the blend showed a drop in viscosity as shown in Table 2, however even after 30 minutes at 320° C. the blends still retained over 70% of the initial melt viscosity thus showing acceptable stability for melt processing even at this high temperature. The examples were tested using the method of FAR F25.4 and according to FAR 25.853 (d). Results for peak heat release are reported in kW/m$^2$. Results for OSU integrated 2 minute heat release are reported in kW-min/m$^2$. The time to peak heat release is reported in seconds. Smoke density (Ds max) was determined according to ASTM E662 and the time to Ds max is reported in minutes.

TABLE 2

| Example | A | 1 | 2 |
|---|---|---|---|
| PPS | 70 | 69 | 67 |
| GF | 30 | 30 | 30 |
| PS/PI | 0 | 1 | 3 |
| MVR 6 min | 33.1 | 32.7 | 31.0 |

TABLE 2-continued

| Example | A | 1 | 2 |
|---|---|---|---|
| MVR 18 min | 35.1 | 35.5 | 35.9 |
| Specific gravity | 1.5701 | 1.5638 | 1.5525 |
| T Mod | 9994 | 10012 | 9590 |
| T Str. | 152 | 146 | 126 |
| Peak heat release | 64 | 37 | 31 |
| OSU integrated 2 min heat release | 19 | 11 | 8 |
| Time to peak heat release | 142 | 180 | 160 |
| Ds Max | 15 | 13 | 12 |
| Time to Ds max | 3.54 | 3.58 | 3.55 |
| Initial viscosity at 320° C. | 4944 | 4780 | 5350 |
| Viscosity after 30 min dwell at 320° C. | 3644 | 3420 | 3790 |
| % viscosity retention | 73.7% | 71.5% | 70.8% |

Examples 1 and 2 show that compositions with only 1-3 weight percent polysiloxane/polyimide copolymer give a sharp reduction in OSU integrated 2 minute heat release and a peak heat release below 40. Time to reach peak heat release increased to over 160 seconds. Smoke density is very low and actually less than that of poly(phenylene sulfide).

Melt volume rate (MVR) is over 30 cc/10 min. Melt stability as shown by the change in viscosity after 30 minutes at 320° C. shows greater than 70% retention of initial viscosity indicating good melt processability. Superior melt stability is also shown by a MVR change, when held at 300° C. from 6 to 18 min, of less than 30% of the initial MVR value.

All samples had peak melting point (Tm) of 280 to 285° C. as per ASTM D3418-12 with a heating rate of 20° C./min.

Examples 3 to 7 and Comparative Example B

The examples were made as described above using the compositions shown in Table 3. Amounts of the components are shown in weight percent based on the total weight of the composition. The compositions were tested as described above. Heat distortion temperature (HDT) was determined according to ASTM D648-07 at 0.45 MPa (66 psi) and 1.82 MPa (264 psi) on 3.2 mm thick bars. Flexural modulus (Flex Mod) and flexural strength at break (Flex Str) were measured according to ASTM D790-10. Flexural modulus is reported in mega Pascals (MPa). Flexural strength is reported in MPa. Flame retardance and flame out time (FOT, reported in seconds) was tested according to UL94 at a thickness of 1.6 millimeters. Shrinkage was measured parallel and perpendicular to the flow direction. Shrinkage was determined by ASTM D955-08 on a 3.2 mm×110 mm disc. Warp was determined as the average of three injection molded edge gated plaques (152×203 mm×3.0 mm) measured at each corner from a flat surface to the bottom of the part with the opposite corner (from the measured corner) of the plaque in contact with the flat surface. Warp is reported in millimeters. All samples had peak melting point (Tm) of 280 to 285° C. as per ASTM D3418-12 with a heating rate of 20° C./min.

TABLE 3

|  | B | 3 | 4 | 5 | 6 | 7 |
|---|---|---|---|---|---|---|
| PPS | 69 | 68 | 64 | 59 | 68 | 68 |
| GF | 20 | 20 | 20 | 20 | 15 | 10 |
| Mica | 10 | 10 | 10 | 10 | 15 | 20 |
| Talc | 1 | 1 | 1 | 1 | 1 | 1 |
| PS/PI | 0 | 1 | 5 | 10 | 1 | 1 |
| MVR 6 min | 35.3 | 31.1 | 35.0 | 35.2 | 29.9 | 24.9 |
| MVR 18 min | 39.3 | 34.2 | 41.6 | 43.5 | 31.3 | 26.0 |
| Specific gravity | 1.6025 | 1.5762 | 1.5927 | 1.5934 | 1.5727 | 1.5561 |
| HDT (66 psi) | 274 | 272 | 273 | 269 | 272 | 262 |
| HDT (264 psi) | 244 | 230 | 225 | 202 | 231 | 106 |
| T Mod | 11020 | 10460 | 10540 | 10360 | 10170 | 9270 |
| T Str | 122 | 110 | 103 | 95 | 107 | 99 |
| Flex Mod | 10700 | 9730 | 10400 | 10200 | 9840 | 8780 |
| Flex Str | 174 | 160 | 153 | 139 | 153 | 145 |
| Peak heat release | 27 | 19 | 19 | 18 | 14 | 11 |
| OSU integrated 2 min heat release | 51 | 43 | 40 | 37 | 36 | 38 |
| Time to peak heat release | 126 | 132 | 143 | 151 | 185 | 198 |
| Ds Max | 28 | 13 | 13 | 13 | 15 | 21 |
| Time to DS max | 3.56 | 3.51 | 3.56 | 3.56 | 3.59 | 3.54 |
| UL94 | V-0 | NA | V-0 | V-0 | NA | V-0 |
| FOT | 1.3 | NA | 1.2 | 1.2 | NA | 1.5 |
| Shrink parallel % | 0.46 | 0.48 | 0.47 | 0.49 | 0.38 | 0.26 |
| Shrink perpendicular % | 0.64 | 0.64 | 0.65 | 0.61 | 0.56 | 0.44 |
| Warp | 14.4 | 14.1 | 1.5 | 0.3 | 8.4 | 9.3 |
| Initial viscosity | 4480 | 4822 | 4726 | 4776 | 6504 | 8562 |
| Viscosity after 30 min dwell | 3411 | 3575 | 3549 | 3451 | 4833 | 6248 |
| % viscosity retention | 76.1% | 74.1% | 75.1% | 72.3% | 74.3% | 73.0% |

NA = not available

Examples 3 through 7 show a marked improvement in warp with the introduction of a platy filler. For comparison Comparative Example A had a warp of 22.5 millimeters. The improvement in warp performance is achieved in combination with improvements in heat release performance. The compositions further show marked decreases in smoke density compared to Comparative Example B.

Embodiment 1

A composition comprising a poly(arylene sulfide); 0.5 to 5 weight percent of a polysiloxane/polyimide block copolymer; and 5 to 50 weight percent of glass fiber wherein weight percent is based on the combined weight of poly(arylene sulfide), polysiloxane/polyimide block copolymer and glass fiber, the polysiloxane/polyimide block copolymer has greater than or equal to 10 weight percent siloxane content, based on the total weight of the polysiloxane/polyimide block copolymer and the composition retains greater than or equal to 60% of the initial viscosity after being retained at 320° C. for 30 minutes and the composition has an OSU peak heat release less than 45 kW/m² when measured using the method of FAR F25.4 and according to FAR 25.853 and further wherein the composition is free of platy filler.

Embodiment 2

The composition of Embodiment 1, where in the composition has a melt viscosity of 3,000 to 10,000 Poise at 320° C. as per ASTM D4440.

Embodiment 3

The composition of Embodiment 1 or 2, wherein the poly(arylene sulfide) is poly(phenylene sulfide) having a crystalline melting point of 250 to 290° C.

Embodiment 4

The composition of any one of Embodiments 1 to 3, wherein the polysiloxane/polyimide block copolymer comprises repeating siloxane units (d) of formula (I):

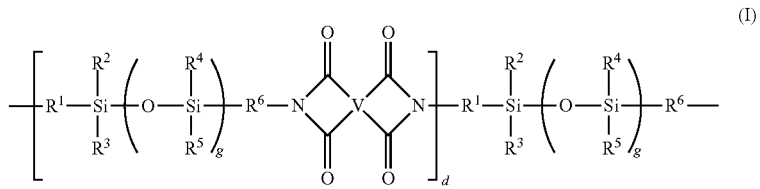

wherein $R^{1-6}$ are independently at each occurrence selected from the group consisting of substituted or unsubstituted, saturated, unsaturated or aromatic monocyclic and polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is greater than or equal to 1.

Embodiment 5

The composition of any one of Embodiments 1 to 4, wherein the polysiloxane/polyimide block copolymer has a siloxane content of 10 to 50 weight percent.

Embodiment 6

The composition of any one of Embodiments 1 to 5, wherein the poly(arylene sulfide) is linear or branched.

Embodiment 7

The composition of any one of Embodiments 1 to 6, wherein the poly(arylene sulfide) is present in an amount of 50 to 94 weight percent.

Embodiment 8

A composition comprising a poly(arylene sulfide); 0.5 to 10 weight percent of a polysiloxane/polyimide block copolymer; 5 to 50 weight percent of glass fiber, and a platy filler, wherein weight percent is based on the combined weight of poly(arylene sulfide), polysiloxane/polyimide block copolymer, glass fiber, and platy filler, the polysiloxane/polyimide block copolymer has greater than or equal to 10 weight percent siloxane content, based on the total weight of the polysiloxane/polyimide block copolymer, the composition retains greater than or equal to 60% of the initial viscosity after being retained at 320° C. for 30 minutes and the composition has an OSU peak heat release less than or equal to 25 kW/m² when measured using the method of FAR F25.4 and according to FAR 25.853 (d).

Embodiment 9

The composition of Embodiment 8, wherein the platy filler comprises flaked glass, mica, or a combination thereof.

Embodiment 10

The composition of Embodiment 8 or 9, wherein the glass fiber and the platy filler are present in a combined amount of 10 to 50 weight percent, based on the combined weight of poly(arylene sulfide), polysiloxane/polyimide block copolymer, glass fiber and platy filler.

Embodiment 11

The composition of any one of Embodiments 8 to 10, wherein the weight ratio of glass fiber to platy filler is 20:80 to 80:20.

Embodiment 12

The composition of any one of Embodiments 8 to 11, where in the composition has a melt viscosity of 3,000 to 10,000 Poise at 320° C. as per ASTM D4440.

Embodiment 13

The composition of any one of Embodiments 8 to 12, wherein the poly(arylene sulfide) is poly(phenylene sulfide) having a crystalline melting point of 250 to 290° C.

Embodiment 14

The composition of any one of Embodiments 8 to 13, wherein the polysiloxane/polyimide block copolymer comprises repeating siloxane units (d) of formula (I):

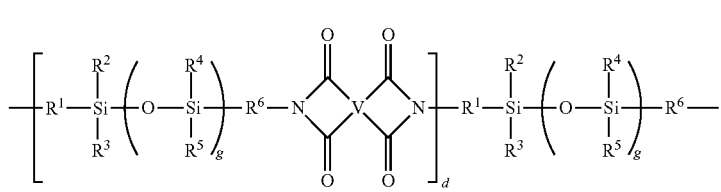

wherein $R^{1-6}$ are independently at each occurrence selected from the group consisting of substituted or unsubstituted, saturated, unsaturated or aromatic monocyclic and polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is greater than or equal to 1.

Embodiment 15

The composition of any one of Embodiments 8 to 14, wherein the polysiloxane/polyimide block copolymer has a siloxane content of 10 to 50 weight percent.

Embodiment 16

The composition of any one of Embodiments 8 to 15, wherein the poly(arylene sulfide) is linear or branched.

Embodiment 17

The composition of any one of Embodiments 8 to 16, wherein the poly(arylene sulfide) is present in an amount of 50 to 94 weight percent.

Embodiment 18

The composition of any of the preceding Embodiments further comprising 0.1 to 5 weight percent talc, based on the combined weight of poly(arylene sulfide), polysiloxane/polyimide block copolymer and glass fiber.

Embodiment 19

A shaped article having a thickness of 0.2 millimeters to 4 centimeters and a length that is at least 10 times longer than the thickness and comprising the composition of any one of the preceding Embodiments.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene ($—CH_2—$) or propylene ($—(CH_2)_3—$)). "Alkenyl" and "alkenylene" mean a monovalent or divalent, respectively, straight or branched chain hydrocarbon group having at least one carbon-carbon double bond (e.g., ethenyl ($—HC=CH_2$) or propenylene ($—HC(CH_3)=CH_2—$). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula $—C_nH_{2n-x}$ and $—C_nH_{2n-2x}—$ wherein x is the number of cyclization(s). "Aryl" means a monovalent, monocyclic or polycyclic aromatic group (e.g., phenyl or naphthyl). "Arylene" means a divalent, monocyclic or polycyclic aromatic group (e.g., phenylene or naphthylene). "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro ($—NO_2$), cyano ($—CN$), hydroxy ($—OH$), halogen, thiol ($—SH$), thiocyano ($—SCN$), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g, benzyl), $C_{7-12}$ alkylarylene (e.g, toluyl), $C_{4-12}$ heterocycloalkyl, $C_{3-12}$ heteroaryl, $C_{1-6}$ alkyl sulfonyl ($—S(=O)_2$-alkyl), $C_{6-12}$ arylsulfonyl ($—S(=O)_2$-aryl), or tosyl ($CH_3C_6H_4SO_2—$), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A composition comprising a poly(arylene sulfide); 0.5 to 10 weight percent of a polysiloxane/polyimide block copolymer; 5 to 50 weight percent of glass fiber, and a platy filler, wherein weight percent is based on the combined weight of poly(arylene sulfide), polysiloxane/polyimide block copolymer, glass fiber, 0.1 to 5 weight percent talc, based on the combined weight of poly(arylene sulfide), polysiloxane/polyimide block copolymer and glass fiber, and platy filler, the polysiloxane/polyimide block copolymer has 10 to 30 weight percent siloxane content, based on the total weight of the polysiloxane/polyimide block copolymer, the composition retains greater than or equal to 60% of the initial viscosity after being retained at 320° C. for 30 minutes and the composition has an OSU peak heat release less than or equal to 25 kW/m² when measured using the method of FAR F25.4 and according to FAR 25.853 (d).

2. The composition of claim 1, wherein the platy filler comprises flaked glass, mica, or a combination thereof.

3. The composition of claim 1, wherein the glass fiber and the platy filler are present in a combined amount of 10 to 50 weight percent, based on the combined weight of poly (arylene sulfide), polysiloxane/polyimide block copolymer, glass fiber and platy filler.

4. The composition of claim 1, wherein the weight ratio of glass fiber to platy filler is 20:80 to 80:20.

5. The composition of claim 1, wherein the composition has a melt viscosity of 3,000 to 10,000 Poise at 320° C. as per ASTM D4440.

6. The composition of claim 1, wherein the poly(arylene sulfide) is poly(phenylene sulfide) having a crystalline melting point of 250 to 290° C.

7. The composition of claim 1, wherein the polysiloxane/polyimide block copolymer comprises repeating siloxane units (d) of formula (I):

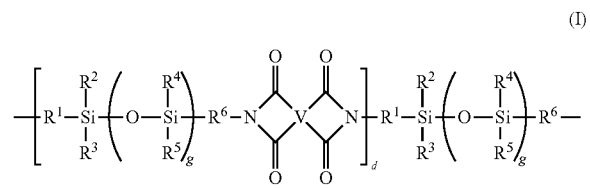

wherein R" are independently at each occurrence selected from the group consisting of substituted or unsubstituted, saturated, unsaturated or aromatic monocyclic and polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is greater than or equal to 1.

8. The composition of claim 1, wherein the poly(arylene sulfide) is linear or branched.

9. The composition of claim 1, wherein the poly(arylene sulfide) is present in an amount of 50 to 94 weight percent.

* * * * *